United States Patent [19]

Iwamoto et al.

[11] Patent Number: 4,532,445
[45] Date of Patent: Jul. 30, 1985

[54] ROTOR OF SUPERCONDUCTIVE GENERATOR

[75] Inventors: Masatami Iwamoto; Shiro Nakamura; Masayuki Miyazaki; Sumio Yoshioka, all of Amagasaki, Japan

[73] Assignee: Mitsubishi Denki Kabushiki Kaisha, Tokyo, Japan

[21] Appl. No.: 575,729

[22] Filed: Feb. 2, 1984

Related U.S. Application Data

[63] Continuation of Ser. No. 314,042, Oct. 22, 1981, abandoned, which is a continuation of Ser. No. 104,827, Dec. 18, 1979, abandoned.

[30] Foreign Application Priority Data

Dec. 29, 1978 [JP] Japan ............................... 53-161608

[51] Int. Cl.$^3$ .............................................. H02K 9/00
[52] U.S. Cl. ...................................... 310/52; 310/261
[58] Field of Search ............... 310/10, 40 R, 52, 59, 310/61, 64, 65, 261

[56] References Cited

U.S. PATENT DOCUMENTS

| | | | |
|---|---|---|---|
| 3,679,920 | 7/1972 | McNab | 310/10 |
| 3,742,265 | 6/1973 | Smith | 310/52 |
| 3,956,648 | 5/1976 | Kirtley | 310/10 |
| 4,042,846 | 8/1977 | Sterret | 310/52 |
| 4,063,122 | 12/1977 | Kullmann | 310/10 |
| 4,076,988 | 2/1978 | Litz | 310/52 |
| 4,085,343 | 4/1978 | Hasegawa | 310/52 |
| 4,152,609 | 5/1979 | Cooper | 310/40 R |
| 4,176,291 | 11/1979 | Rabinowitz | 310/10 |
| 4,267,473 | 5/1981 | Gamble | 310/52 |
| 4,295,068 | 10/1981 | Gamble | 310/52 |

OTHER PUBLICATIONS

"A6250 KVA Superconducting Gererator", M. Iwamoto et al., IEEE Pwr. Eng. Soc., avail. for printing 11/3/78.

*Primary Examiner*—R. Skudy
*Attorney, Agent, or Firm*—Oblon, Fisher, Spivak, McClelland & Maier

[57] ABSTRACT

A torque tube is firmly connected in a damper and a thickness of the damper is more than two times of a thickness of the torque tube in a rotor of a superconductive generator. The rotor has excellent thermal and mechanical characteristics. The damper and the torque tube is formed in one piece and the torque tube is provided with a coil fitting part.

15 Claims, 9 Drawing Figures

ROTOR OF SUPERCONDUCTIVE GENERATOR

This application is a continuation of application Ser. No. 314,042, filed Oct. 22, 1981, which is a continuation of application Ser. No. 104,827, filed Dec. 18, 1979, now abandoned.

BACKGROUND OF THE INVENTION

1. Field of the Invention

The present invention relates to a structure of a rotor of a superconductive generator. More particularly, it relates to a rotor in which a connecting part between a damper and a torque tube has excellent mechanical strength and is not adversely affected by heat shrinkage.

2. Description of the Prior Art

FIG. 1 shows a conventional rotor of a superconductive generator.

In FIG. 1, a torque tube (1) is placed to be surrounded by a damper (2) and a superconductive coil (3) is placed inside of the torque tube (1). The superconductive coil (3) is held at a central zone of the torque tube (1). The shaft (4) of the rotor is held by a bearing (5). One end of the torque tube (1) is formed in one piece with the damper (2) and the shaft (4) and the other end of the torque tube (1) is connected through a movable part (6) to the end of the damper (2).

The damper (2) is also used as a vacuum vessel.

When the superconductive coil (3) placed in the torque tube (1) in the rotor of the superconductive generator having said structure is cooled to a cryogenic temperature of about $-269°$ C., the electric resistance becomes zero and the excitation loss is eliminated and the stong magnetic field is generated by the superconductive coil (3) and the AC power is generated from a stator (not shown).

Thus, a flexible movable part (6) is formed between the torque tube (1) and the damper (2) to prevent the affect caused by the heat shrinkage. The torque tube (1) is cooled to a cryogenic temperature together with the superconductive coil (3) and accordingly, the heat shrinkage of the torque tube is caused whereby certain discrepancy is caused to the damper (2) formed in one piece with the torque tube (1) by the heat shrinkage. In order to prevent the affect of the heat shrinkage, the movable part (6) is formed between the end of the torque tube (1) and the damper (2).

There is the other conventional feature shown in FIG. 2 wherein a movable part (6) is formed at one end of the damper (2) so as to prevent the discrepancy caused by the heat shrinkage between the torque tube (1) and the damper (2).

In the conventional rotor of the superconductive generator, the adverse affect caused by the heat shrinkage can be prevented by the movable part (6). On the contrary, the movable part is mechanically brittle. Thus, the dangerous speed of the rotor may be too low or the vibration caused by the rotation may be severe. Further more, the structure of the movable part (6) is complicated not to be easily assembled.

SUMMARY OF THE INVENTION

It is an object of the present invention to provide a rotor of a superconductive generator in which thicknesses of a damper and a torque tube are selected and the damper and the torque tube are formed in one piece without a movable part so as to reduce a heat shrinkage and to reduce a vibration in the rotation.

The present invention is to provide a rotor of a superconductive generator in which a torque tube is firmly fixed on a damper in one piece and a thickness of the damper is more than two times of the thickness of the torque tube whereby the rotor has excellent thermal and mechanical advantages.

DETAILED DESCRIPTION OF THE PREFERRED EMBODIMENTS

Figure 1:
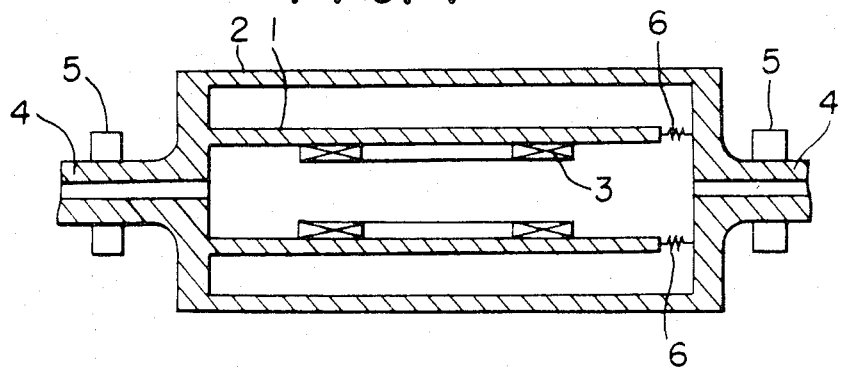
FIG. 1 is a sectional view of the conventional rotor of the superconductive generator.
Figure 2:
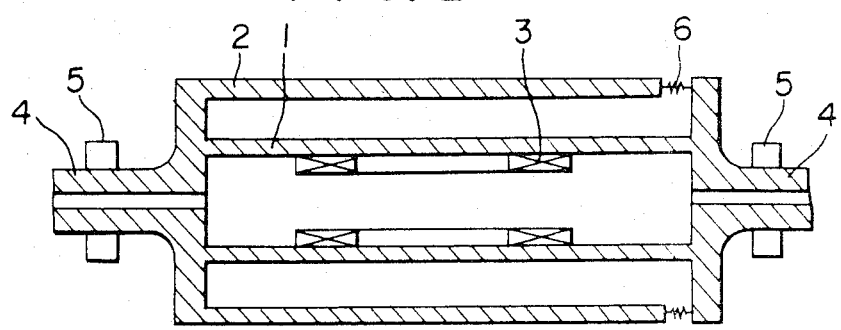
FIG. 2 is a sectional view of the other conventional rotor of the superconductive generator.
Figure 3:
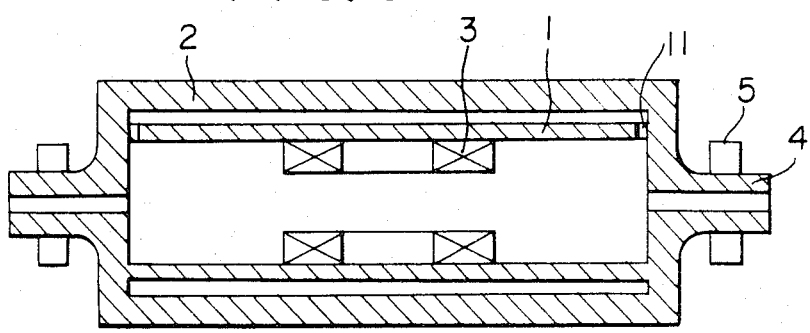
FIG. 3 is a sectional view of one embodiment of the rotor of the superconductive generator of the present invention.

Referring to FIG. 3, one embodiment of the rotor of the superconductive generator will be illustrated. The parts corresponding to those of the parts shown in FIGS. 1 and 2 with the same reference numerals are not repeatedly described.

In FIG. 3, the torque tube (1) is firmly fixed to the damper (2) by a form of connection (11) which can be a welding or a bolt without connecting them through a movable part as the conventional structure. The thickness of the damper (2) is more than two times of the thickness of the torque tube (1). The other structure is the same as those of the elements in the conventional rotor.

Figure 4:
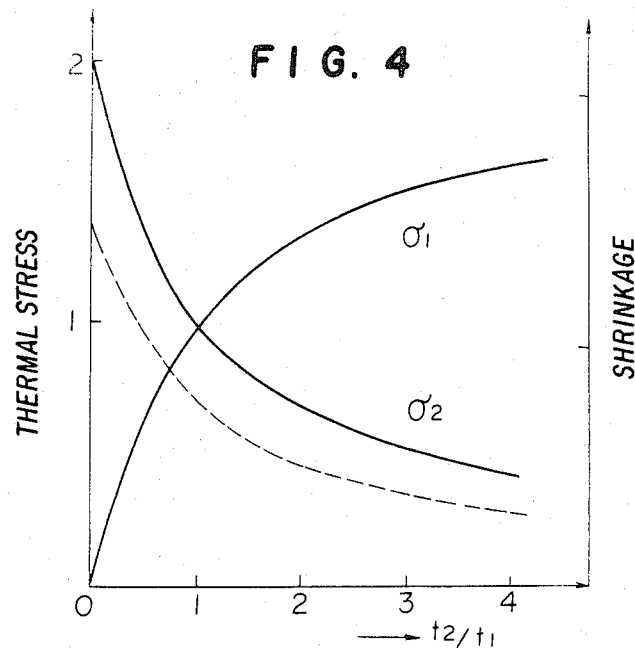
FIG. 4 is a graph for showing thermal stresses of the torque tube and the damper shown in FIG. 3 and shrinkage in cooling the rotor.

In the rotor of the superconductive generator of the present invention which has said structure, the thermal stress $\sigma_1$ applied to the torque tube (1) and the thermal stress $\sigma_2$ applied to the damper (2) can be given by the equations.

$$\sigma_1 = E\alpha \Delta T \cdot t_2/(t_1 + t_2) \\ \sigma_2 = E\alpha \Delta T \cdot t_1/(t_1 + t_2) \quad \text{(I)}$$

wherein $t_1$ designates the thickness of the torque tube (1); $t_2$ designates the thickness of the damper (2); E designates Young's modulus; $\alpha$ designates a thermal expansion coefficient of the substrate; and $\Delta T$ designates a cooling temperature difference of the torque tube (1). Therefore, when the thermal stress formed in the thickness $t_1$ of the torque tube (1) equal to the thickness $t_2$ of the damper (2) in FIG. 4 is the reference value (The thermal stress in FIG. 4 is 1), the thermal stress $\sigma_1$ of the torque tube (1) is increased and the thermal stress $\sigma_2$ of the damper (2) is decreased by increasing the thickness $t_2$ of the damper (2) over the thickness $t_1$ of the torque tube (1).

As shown by the dotted line, the shrinkage of the rotor in the cooling is decreased by increasing the thickness $t_2$ of the damper (2) over the thickness $t_1$ of the torque tube (1). Thus, in general, a yield strength of a metal substrate is increased at a lower temperature. Therefore, in the case of the rotor in which the temperature of the torque tube (1) is remarkably lower than that of the damper (2), the improvement of the yield strength of the torque tube (1) at the lower temperature is effectively utilized to design rationally by selecting the thickness of the damper (2) to be thicker than the thickness of the torque tube (1) having the improved yield strength at lower temperature.

Figure 5:
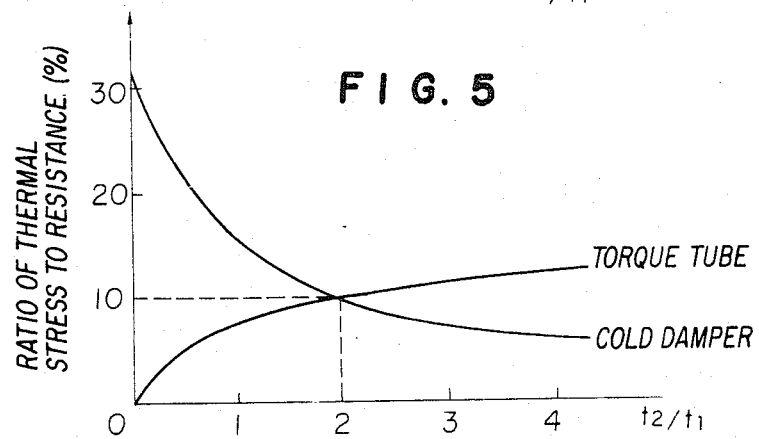
FIG. 5 is a graph for showing ratio of thermal stress to resistance of the torque tube and the damper.

FIG. 5 shows the thermal stresses caused by the torque tube (1) and the damper (2) which are made of titanium or titanium alloy as the ratios of the thermal stresses to the yield strength from the above-mentioned viewpoint.

In general, the yield strength of a metal substrate at cryogenic temperature is about two times of the same at the ambient temperature. As a result, the yield strength of the torque tube (1) at the cryogenic temperature is approximately two times of that at the ambient temperature. On the other hand, the yield strength of the cold damper (2) at the ambient temperature is the same. Thus, the ratio of the yield strength to the thermal stress is substantially the same and the allowances of the torque tube (1) and the damper (2) in the thermal stress design are substantially the same when the thickness $t_1$ of the torque tube (1) and the thickness $t_2$ of the damper (2) are given as $t_2 = 2t_1$ in FIG. 5. Thus, the thermal stress is applied to the damper (2) as the compressive stress whereas the thermal stress is applied to torque tube (1) as the tensile stress. It is necessary to increase the thickness $t_2$ in view of the bending characteristic for the compressing force applied to the damper (2). Therefore, in accordance with the present invention, the damper (2) and the torque tube (1) of the rotor are formed in one piece and the thicknesses of the damper and the torque tube are selected as $t_2 \geq 2t_1$ thereby providing a rotor having high reliability and small heat shrinkage and low vibration in the rotation which can be easily prepared because any movable part required in the conventional rotor is not formed.

The damper and the torque tube of the rotor of the present invention can be made of an economical metal such as stainless steel. Thus, it is possible to increase the yield strengths of these parts by using titanium or titanium alloy which has smaller Young's modulus and smaller thermal expansion coefficient.

The damper and the torque tube of the rotor of the present invention are formed in one piece by welding or by screwing with bolts without connecting them by a movable part required in the conventional one. The both ends of the damper and the torque tube formed in one piece can be fixed to a flange (7) of the rotary shaft (4) by bolts (8) shown in FIG. 6c to assemble the rotor. In such case, the assembling operation for the superconductive coil (3) is easy.

Figure 7:
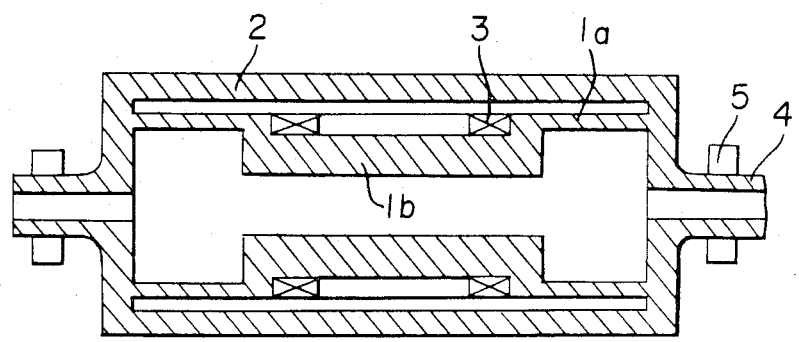
FIG. 7 is a sectional view of the other embodiment of the rotor of the semiconductive generator of the present invention.

Referring to FIG. 7, the other embodiment of the present invention will be illustrated.

In the former embodiments, a thickness of the torque tube (1) is uniform. In this embodiment, a thickness of the coil fitted part (1b) the torque tube (1) is thicker than a thickness of the heat insulating part (1a) (at both ends) of the torque tube (1). The coil (3) is fitted so as to surround the coil fitting part (1b) at the outer surface.

Figure 6:
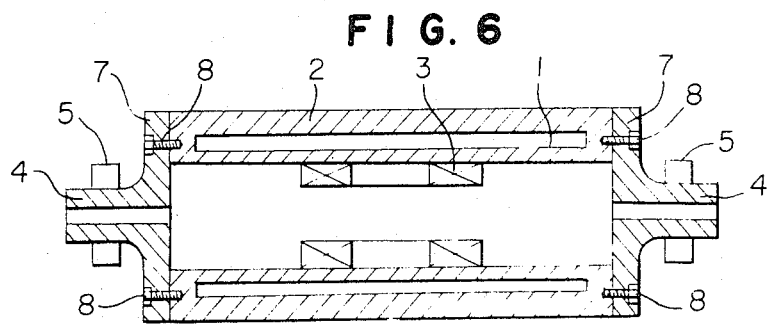
FIGS. 6a, 6b and 6c are sectional views of the other embodiment of the rotor of the superconductive generator.
Figure 6A:
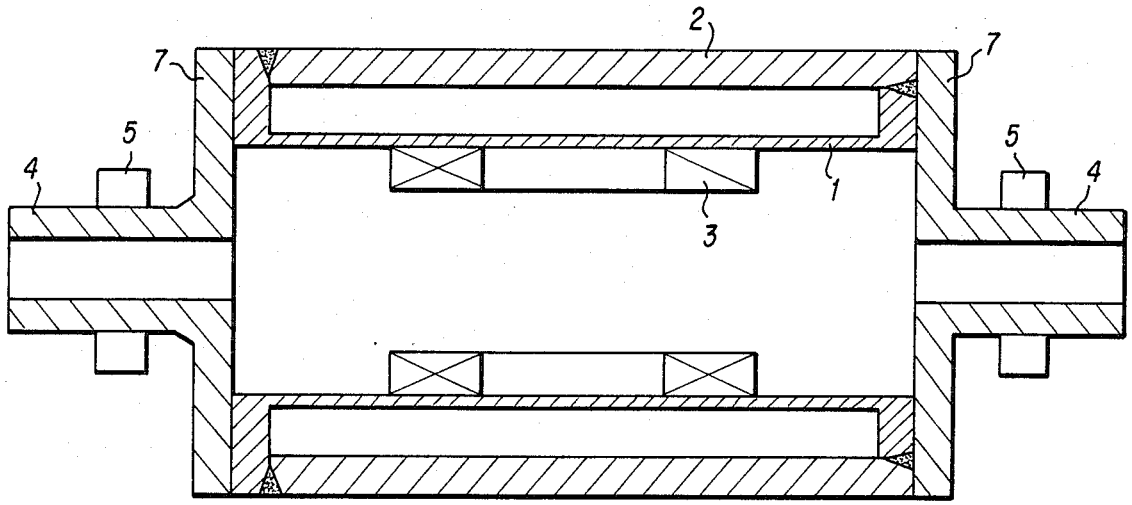
Figure 6B:
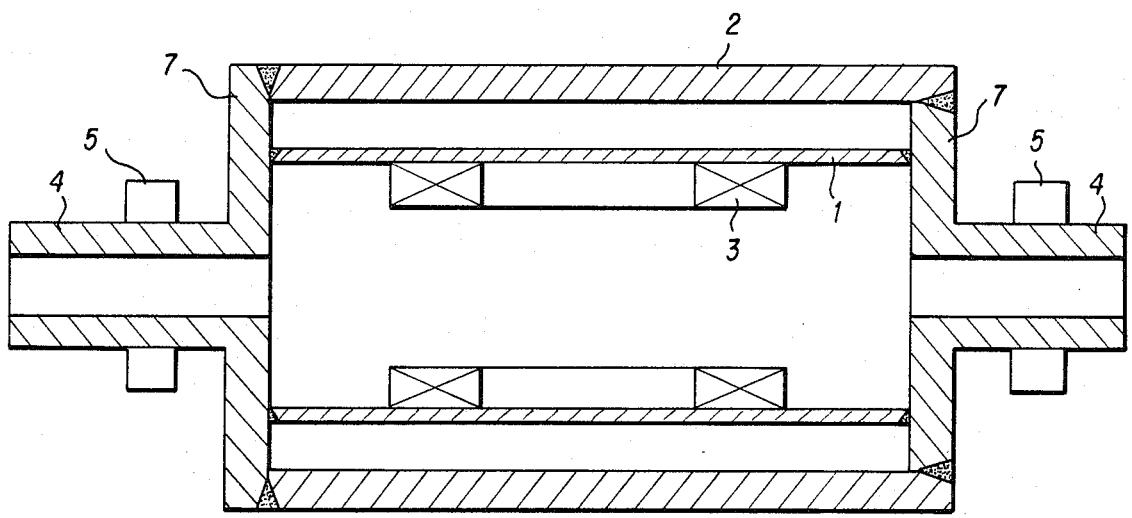

The damper (2) and the torque tube (1) are made of titanium or titanium alloy and are formed in one piece by a welding similar to the welding shown in FIG. 6a and 6b or by a fixing bolt similar to the bolt shown in FIG. 6c. The other structure of this embodiment is the same as the former embodiments.

In view of enough thickness of the coil fitted art (1b) of the torque tube (1), the thermal stress $\sigma_1$ at the heat insulating part (1a) and the thermal stress $\sigma_2$ at the damper (2) are considered. The thermal stresses $\sigma_1$ and $\sigma_2$ are given by the following equations.

$$\left. \begin{array}{l} \sigma_1 = E\alpha \cdot \Delta T \cdot t_2/(t_1 + t_2 \cdot k) \\ \sigma_2 = E\alpha \cdot \Delta T \cdot t_1/(t_1 + t_2 \cdot k) \end{array} \right\} \quad (II)$$

wherein $$ke = \frac{\text{length of insulating part (1a) of torque tube (1)}}{\text{total length of damper (2)}}$$

The equations II are different from the equations I so as to change $(t_1 + t_2)$ to $(t_1 + t_2 \cdot k)$ in the denominator. Thus, when $t_2 = 2t_1$, the ratio of the thermal stress to the durability is the same and the same effect of the former embodiments can be expected.

We claim:

1. In a rotor of a superconductive generator having a torque tube in a damper, a shaft and a superconductive coil fitted to said torque tube, an improvement comprising:

said damper and said torque tube being formed in one piece without a movable part by directly and firmly connecting said damper and said torque tube to each other at each end of said torque tube by one of welding and bolting said damper to said torque tube;

said damper having a thickness at least two times the thickness of said torque tube such that the ratio of thermal stress to resistance in said torque tube is at least as great as that in said damper;

said torque tube having a heat insulating part; and said torque tube having a coil fitting part wherein a thickness of said coil fitting part of said torque tube is thicker than a thickness of said heat insulating part.

2. A rotor of a superconductive generator according to claim 1 further comprising:

a flange rotatable with said shaft in one unit with said flange being connected by a connection means to said one piece formed by said damper and said torque tube.

3. A rotor of superconductive generator according to claim 1, wherein said one of welding and bolting comprises welding.

4. A rotor of superconductive generator according to claim 2, wherein said connection means comprises welding.

5. A rotor of a superconductive generator according to claim 1, wherein said one of said welding and bolting comprises bolting.

6. A rotor of a superconductive generator according to claim 2, wherein said connection means comprises a bolt.

7. A rotor of a superconductive generator according to claim 1, wherein said damper and said torque tube are made of titanium and titanium alloy.

8. A rotor of a superconductive generator according to claim 2, wherein said damper and said torque tube are made of one of titanium and titanium alloy.

9. A rotor of a superconductive generator according to claim 3, wherein said damper and said torque tube are made of one of titanium and titanium alloy.

10. A rotor of a superconductive generator according to claim 4, wherein said damper and said torque tube are made of one of titanium and titanium alloy.

11. A rotor of a superconductive generator according to claim 5, wherein said damper and said torque tube are made of one of titanium and titanium alloy.

12. A rotor of a superconductive generator according to claim 6, wherein said damper and said torque tube are made of one of titanium and titanium alloy.

13. A rotor of a superconductive generator according to claim 2, further comprising:
   said torque tube having a heat insulating part; and
   said torque tube having a coil fitting part wherein a thickness of said coil fitting part of said torque tube is thicker than a thickness of said heat insulating part.

14. A rotor of a superconductive generator according to claim 1, wherein said superconductive coil is placed outside of said torque tube.

15. A rotor of a superconductive generator according to claim 1 wherein said damper and said torque tube are made of a titanium alloy.

* * * * *